(12) United States Patent
Ebihara

(10) Patent No.: US 7,213,900 B2
(45) Date of Patent: May 8, 2007

(54) RECORDING SHEET AND IMAGE RECORDING APPARATUS

(75) Inventor: Toshiyuki Ebihara, Hino (JP)

(73) Assignee: Olympus Corporation, Tokyo (JP)

( * ) Notice: Subject to any disclaimer, the term of this patent is extended or adjusted under 35 U.S.C. 154(b) by 289 days.

(21) Appl. No.: 10/861,770

(22) Filed: Jun. 3, 2004

(65) Prior Publication Data

US 2004/0224102 A1    Nov. 11, 2004

Related U.S. Application Data

(63) Continuation of application No. PCT/JP02/12828, filed on Dec. 6, 2002.

(30) Foreign Application Priority Data

Dec. 6, 2001    (JP)    ............................. 2001-373002

(51) Int. Cl.
*B41J 29/393*    (2006.01)
*B41J 2/01*    (2006.01)
(52) U.S. Cl. ........................................ 347/19; 347/105
(58) Field of Classification Search .................. 347/19, 347/18
See application file for complete search history.

(56) References Cited

U.S. PATENT DOCUMENTS

| | | | | |
|---|---|---|---|---|
| 5,451,990 A | * | 9/1995 | Sorenson et al. | ............. 347/37 |
| 5,564,841 A | * | 10/1996 | Austin et al. | ............... 400/103 |
| 6,109,722 A | * | 8/2000 | Underwood et al. | ........... 347/19 |
| 6,404,517 B1 | * | 6/2002 | Chao | ............................ 358/504 |
| 6,450,634 B2 | * | 9/2002 | Elgee et al. | ................. 347/106 |
| 6,561,615 B2 | * | 5/2003 | Okawa et al. | ................. 347/19 |
| 6,585,341 B1 | * | 7/2003 | Walker et al. | ................. 347/14 |
| 6,712,536 B2 | * | 3/2004 | Miyano | ...................... 400/582 |
| 6,714,748 B1 | * | 3/2004 | Nakayasu et al. | ............. 399/72 |
| 6,731,393 B1 | * | 5/2004 | Currans et al. | ............. 358/1.12 |

FOREIGN PATENT DOCUMENTS

| | | |
|---|---|---|
| JP | 5-294015 A | 11/1993 |
| JP | 6-255175 | 9/1994 |
| JP | 9-123482 A | 5/1997 |
| JP | 10-115955 | 5/1998 |
| JP | 11-254793 A | 9/1999 |
| JP | 2000-6502 A | 1/2000 |
| JP | 2000-25214 A | 1/2000 |
| JP | 2001-30619 A | 2/2001 |
| JP | 2001-109218 A | 4/2001 |

\* cited by examiner

*Primary Examiner*—Stephen Meier
*Assistant Examiner*—Rene Garcia, Jr.
(74) *Attorney, Agent, or Firm*—Frishauf, Holtz, Goodman & Chick, P.C.

(57) ABSTRACT

There is disclosed a recording sheet for use in an image recording apparatus which forms an image by a recording head, the recording sheet has a pattern for measurement in which a correction amount for correction of a positional shift of a recorded dot recorded by the recording head is measurable based on a positional relationship with an image for measurement formed by the recording head, and accordingly it is possible to correct arrangement of recorded dots and to record an image without any distortion.

5 Claims, 10 Drawing Sheets

RECORDING SHEET AND IMAGE RECORDING APPARATUS

CROSS-REFERENCE TO RELATED APPLICATIONS

This is a Continuation Application of PCT Application No. PCT/JP02/12828, filed Dec. 6, 2002, which was not published under PCT Article 21(2) in English.

This application is based upon and claims the benefit of priority from prior Japanese Patent Application No. 2001-373002, filed Dec. 6, 2001, the entire contents of which are incorporated herein by reference.

BACKGROUND OF THE INVENTION

1. Field of the Invention

The present invention relates to image recording apparatuses such as a printer, facsimile machine, and copying machine, particularly to a recording sheet in which distortion of an image recorded by an image recording apparatus using a plurality of recording heads to increase a recording width is corrected and to image recording apparatus using this recording sheet.

2. Description of the Related Art

An image recording apparatus of a photosensitive recording system, thermal transfer recording system, ink jet recording system or the like has been used in image recording apparatuses such as a printer and a copier machine. A recording head in which a large number of recording devices for recorded dots are linearly arranged at equal intervals is used in these recording systems.

Preparation of a recording head having a large recording length has a problem that yield becomes worse and cost increases with a larger length, and it has been proposed that a recording width be extended using a large number of recording heads. For example, in Jpn. Pat. Appln. KOKAI Publication No. 6-255175, a method has been described in which a plurality of recording heads are linearly arranged in such a manner that end portions of the heads overlap with each other to a certain degree. A position from which the recording head is to be switched in supplying an image signal to each recording head is irregularly set for each scanning line with respect to a region where the recording devices are redundant, so that joints become inconspicuous and the recording heads are easily arranged.

Moreover, in Jpn. Pat. Appln. KOKAI Publication No. 10-115955, a method and an image recording apparatus have been described in which to form a color image by a plurality of recording heads, a positional shift of each recording head is corrected to obtain an image having a satisfactory image quality from Moire fringes produced by superimposing test patterns formed by the respective recording heads.

Furthermore, in Jpn. Pat. Appln. KOKAI Publication No. 2000-25214, a method is described in which synchronization is controlled in a case where a width direction of a page is divided to perform printing by a plurality of recording heads.

According to conventional art, positional shifts of recorded dots of different colors printed in the same position of a recording sheet, and positional shifts of recorded dots of connection portions between recording heads adjacent in a width direction can be corrected. However, when a plurality of recording heads are connected to each other to expand a recording width, and arrangement of dots recorded by the respective recording heads shifts from a straight line, the recorded image is also distorted, but this cannot be corrected.

BRIEF SUMMARY OF THE INVENTION

An object of the present invention is to provide a recording sheet and an image recording apparatus for correcting arrangement of recorded dots to record an image without any distortion in image recording in which a plurality of recording heads are connected to each other to constitute a recording head substantially having a large recording width.

According to a first aspect of the present invention, there is provided a recording sheet for use in an image recording apparatus which forms an image by a recording head, the recording sheet having a pattern for measurement in which a correction amount for correction of a positional shift of a recorded dot recorded by the recording head is measurable based on a positional relationship with an image for measurement formed by the recording head.

In this constitution, the pattern for measurement is disposed in which the correction amount for the correction of the positional shift of the recorded dot recorded by the recording head is measurable based on the positional relationship with the image for measurement formed by the recording head, and therefore the recorded dot positional shift can be corrected. The present constitution corresponds to first to fourth embodiments described later.

Moreover, a recording sheet according to a second aspect of the present invention relates to the recording sheet according to the first aspect of the present invention, and the pattern for measurement is formed in a color different from that of the image for measurement.

In this constitution, since the pattern for measurement is formed in the color different from that of the image for measurement, a positional relationship between the pattern for measurement and the image for measurement can be easily grasped. The present constitution corresponds to the first embodiment described later.

Furthermore, a recording sheet according to a third aspect of the present invention relates to the recording sheet according to the first aspect of the present invention, and the pattern for measurement is formed in a plurality of colors.

In this constitution, since the pattern for measurement is formed in the plurality of colors, the positional relationship between the pattern for measurement and the image for measurement can be easily grasped.

Additionally, a recording sheet according to a fourth aspect of the present invention relates to the recording sheet according to the first aspect of the present invention, and the pattern for measurement is formed in a line width different from that of the image for measurement.

In this constitution, since the pattern for measurement is formed in a line thinner than that of the image for measurement, the positional relationship between the pattern for measurement and the image for measurement can be easily grasped. The present constitution corresponds to the first embodiment described later.

Moreover, a recording sheet according to a fifth aspect of the present invention relates to the recording sheet according to the first aspect of the present invention, and the pattern for measurement comprises repetition of a basic shape pattern.

In this constitution, since the pattern for measurement comprises the repetition of a basic shape, and the positional relationship between the pattern for measurement and the image for measurement is measured a plurality of times to obtain an average value, precision of measurement can be enhanced. The present constitution corresponds to the first embodiment described later.

Furthermore, a recording sheet according to a sixth aspect of the present invention relates to the recording sheet according to the first aspect of the present invention, and the pattern for measurement comprises a stripe pattern including a plurality of straight lines having different intersection angles with respect to a direction in which the recording sheet is conveyed.

In this constitution, since the pattern for measurement is formed in a plurality of stripe patterns having different directions, inclination of the recording head can be easily measured from an intensity of a Moire fringe generated by recording the image for measurement. The present constitution corresponds to the second embodiment described later.

Additionally, a recording sheet according to a seventh aspect of the present invention relates to the recording sheet according to the first aspect of the present invention, and a region of the pattern for measurement is subjected to blur preventive processing of ink with respect to at least a conveying direction of the recording sheet.

In this constitution, since the region of the pattern for measurement is subjected to the blur preventive processing of the ink, the positional relationship between the pattern for measurement and the image for measurement can be more correctly measured. The present constitution corresponds to the first embodiment described later.

Moreover, a recording sheet according to an eighth aspect of the present invention relates to the recording sheet according to the first aspect of the present invention, and an identification mark indicating a type of the pattern for measurement is disposed on a sheet surface of the recording sheet.

In this constitution, since the identification mark indicating the type of the pattern for measurement is attached, identification of the pattern for measurement or distinction from a usual recording sheet can be automatically performed. The present constitution corresponds to the second embodiment described later.

Furthermore, a recording sheet according to a ninth aspect of the present invention relates to the recording sheet according to the ninth aspect of the present invention, and the recording sheet is a rolled sheet having the pattern for measurement in a tip portion.

In this constitution, since the rolled sheet having the pattern for measurement in the tip portion is used, it is possible to correct the positional shift of the recorded dot of the image whose recording width is expanded by interconnection of the images recorded by a plurality of recording heads. The present constitution corresponds to the third embodiment described later.

Additionally, according to a tenth aspect of the present invention, there is provided an image recording apparatus in which the recording sheet according to any one of the first to sixth aspects of the present invention is used and which records an image whose recording width is expanded by interconnection of the images recorded on the sheet for recording by a recording head, the apparatus comprising: a measurement image generation section which produces an image for measurement to make possible positional shift measurement of a recorded dot recorded on the pattern for measurement by the recording head; a positional shift measurement section which measures a positional shift amount based on a positional relationship between the image produced by the measurement image generation section and the pattern for measurement; and a position correction section which corrects a position of a recorded image formed by the recording head based on the positional shift amount measured/obtained by the positional shift measurement section.

In this constitution, the image for measurement combined with the pattern for measurement so that the positional shift of the recording head can be measured is produced and recorded, and therefore the positional shift of the recorded dot of the image recorded by the recording head can be corrected. The present constitution corresponds to the first embodiment described later.

Moreover, an image recording apparatus according to an eleventh aspect of the present invention relates to the image recording apparatus according to the tenth aspect of the present invention, and comprises: a mark identification section which identifies presence/absence of an identification mark and type of the recording sheet according to the eighth aspect of the present invention; and an image data selection device which selects image data for measurement to be recorded in accordance with an identification result in the mark identification section.

Since this constitution comprises the mark identification section which identifies the type of the recording sheet, and the image data selection device which selects the image data to be recorded in accordance with the identification result in the mark identification section, the type of the recording sheet to be supplied is identified, and a user records an input image with a usual recording sheet. When the recording sheet has the pattern for measurement, the image for measurement can be automatically selected and recorded in accordance with the pattern for measurement. The present constitution corresponds to the first embodiment described later.

Furthermore, an image recording apparatus according to a twelfth aspect of the present invention relates to the image recording apparatus according to the tenth aspect of the present invention, comprises a detection section which detects that the recording sheet has been replaced, and records the image for measurement is recorded at a first image recording time after detecting the replacement of the recording sheet in the detection section.

Since this constitution comprises the detection section to detect the replacement of the recording sheet, and records the image for measurement at the first image recording time after detecting the replacement of the recording sheet to correct the positional shift of the recorded dot every time a roll of recording sheet is replaced, a high image quality can be constantly maintained. The present constitution corresponds to the first embodiment described later.

Additionally, an image recording apparatus according to a thirteenth aspect of the present invention relates to the image recording apparatus according to the tenth aspect of the present invention, and the positional shift measurement section includes an image reading section using a line sensor which scans in a direction intersecting with a line constituting at least an image or a pattern of the image for measurement and the pattern for measurement in an oblique direction to read the image.

In this constitution, since the image reading section scans in the oblique direction with respect to a sheet conveying direction at an image recording time to read the image, a correction amount of a recorded dot position can be calculated with high precision.

Moreover, an image recording apparatus according to a fourteenth aspect of the present invention relates to the image recording apparatus according to the tenth aspect of the present invention, and includes: an image rotation section which rotates image data read by the image reading section; an interpolation section which interpolates each row of the image data rotated by the image rotation section to increase the number of data; and an average value calculation section which calculates an average value of each column of output data of the interpolation section.

In this constitution, the image scanned and read in the oblique direction with respect to a sub-scanning direction at the image recording time is rotated so as to dispose a stripe pattern or the like which is a content of the image in parallel with an outer frame of the image in the image rotation section, the number of data is increased in the interpolation section, and subsequently the average value is obtained in the average value calculation section, so that the correction amount of the recorded dot position can be calculated with high precision. The present constitution corresponds to the third embodiment described later.

Furthermore, an image recording apparatus according to a fifteenth aspect of the present invention relates to the image recording apparatus according to the tenth aspect of the present invention, the pattern for measurement comprises parallel lines arranged at equal intervals, the image for measurement also comprises parallel lines arranged at equal intervals, and the positional shift measurement section measures a positional shift amount of the recorded dot recorded by the recording head in accordance with a Moire pattern produced by the pattern for measurement and the image for measurement.

In this constitution, in the Moire fringe measurement section, Moire fringes are checked which are generated in the image obtained by recording the image for measurement in the pattern for measurement comprising a plurality of stripe patterns having different directions in the recording sheet according to the sixth aspect of the present invention, and an inclination of the recording head is obtained from a direction of the stripe pattern having a longest period of Moire fringe. The present constitution corresponds to the second embodiment described later.

Moreover, according to a sixteenth aspect of the present invention, there is provided an image recording apparatus comprising: a first recording section which records a first image capable of distinguishing a line direction of a recording head; a second recording section which records a second image capable of distinguishing a conveying direction of a recording sheet; and a recorded dot position correction section which corrects a position of a recorded dot formed by the recording head in accordance with an angle formed by the line direction obtained from the first image and the conveying direction obtained from the second image.

In this constitution, in order to direct the recording head vertically to the conveying direction of the recording sheet, an attaching angle of the recording head is obtained in the recording section which records the first image capable of distinguishing the conveying direction of the recording sheet, and the recording section which records the second image capable of distinguishing the line direction of a recording device disposed in the recording head. Therefore, the position of the recorded dot can be corrected using angle information in the recorded dot position correction section. The present constitution corresponds to the fourth embodiment described later.

Moreover, an image recording apparatus according to a seventeenth aspect of the present invention relates to the image recording apparatus according to the sixteenth aspect of the present invention, and further includes an image reading section which reads the first and second images recorded on a sheet for recording, and the recorded dot position correction section includes an angle calculation section which obtains an angle formed by the line direction and the conveying direction from the image data read by the image reading section.

Since this constitution includes the image reading section and angle calculation section in addition to the constitution of the image recording apparatus according to the sixteenth aspect of the present invention, a correction process of the recorded dot position can be performed only by the present apparatus. The present constitution corresponds to the fourth embodiment described later.

Furthermore, according to an eighteenth aspect of the present invention, there is provided an image recording apparatus comprising: a plurality of recording heads which expand a recording width by interconnection of recorded images to record the images; and a measurement pattern generation section to produce image data for measurement including a pattern in which positions of line directions of the plurality of recording heads are fixed and a pattern in which the positions of the line directions are moved every line or lines.

In this constitution, the image obtained by inputting and recording the image data produced in the measurement pattern generation section in each of the plurality of recording heads includes the pattern in which the position of the line direction is fixed and the pattern in which the position moves in the line direction. Therefore, the positional relationship of the plurality of recording heads in the line direction can be easily checked by the positional relationship between the pattern in which the position of the line direction recorded by one of two adjacent recording heads is fixed and the pattern which moves in the line direction recorded by the other recording head. The present constitution corresponds to the sixth embodiment described later.

Moreover, an image recording apparatus according to a nineteenth aspect of the present invention relates to the image recording apparatus according to the eighteenth aspect of the present invention, and the image data for measurement is a figure comprising a segment in which a position of one end in the line direction is fixed and a position of the other end changes every line or lines.

In this constitution, the image data produced in the measurement image generation section forms an image whose width of the line direction changes. Therefore, a position of a gap (non-printed portion) generated in the image formed by inputting and recording the image data in each of the plurality of recording heads can be checked to easily check the positional relationship among the plurality of recording heads in the line direction. The present constitution corresponds to the sixth embodiment described later.

DETAILED DESCRIPTION OF THE INVENTION

Embodiments of the present invention will be described hereinafter in detail with reference to the drawings.

(First Embodiment)

Figure 1A:
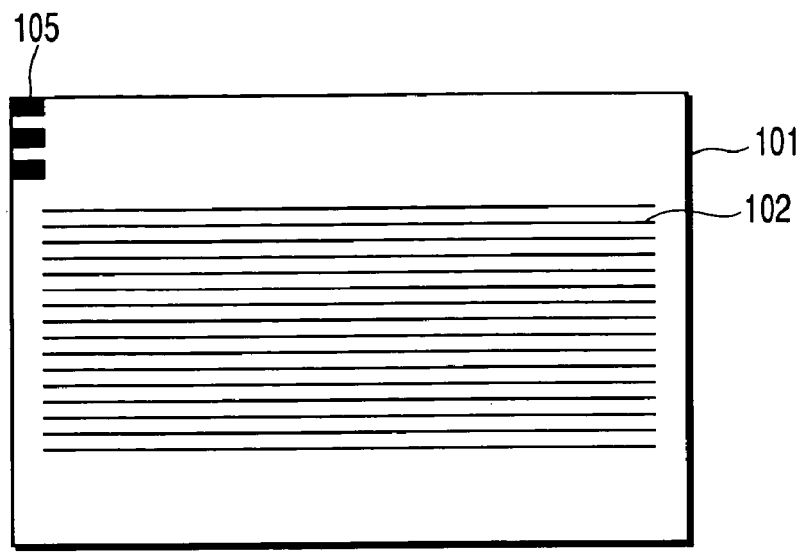
FIG. 1A is a diagram showing a first embodiment of the present invention.
Figure 1B:
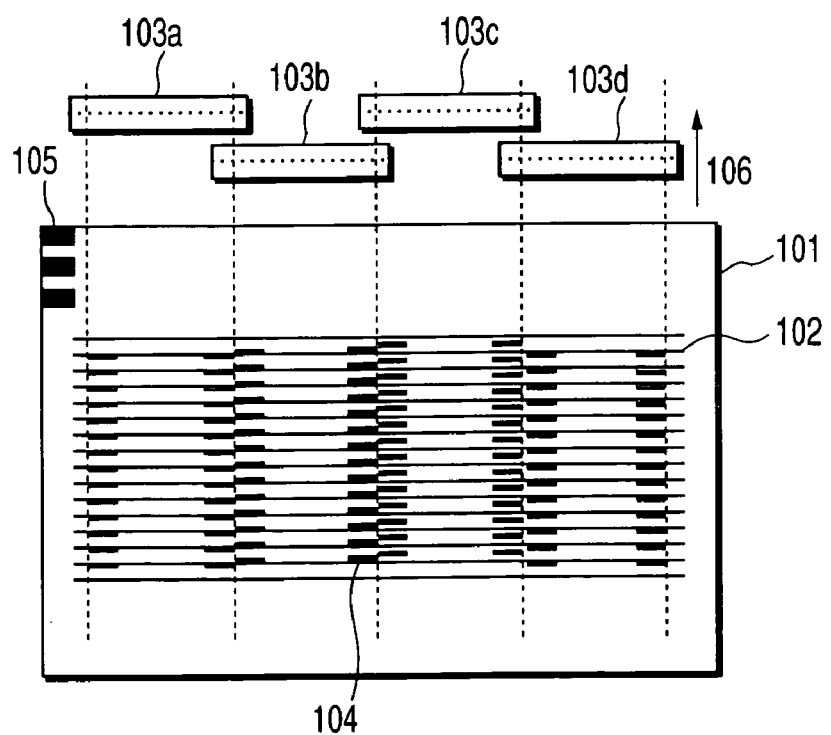
FIG. 1B is a diagram showing a relationship between a recording head and a recorded dot.

FIG. 1A is a diagram showing a first embodiment of the present invention. In FIG. 1A, reference numeral 101 denotes a recording sheet main body, 102 denotes a pattern for measurement, and 105 denotes marks indicating a type of the pattern for measurement 102. An interval between lines of the pattern for measurement 102 is twice a basic dot pitch in a sheet conveying direction of an image recording apparatus. FIG. 1B is a diagram showing a relationship between a recording head and a recorded dot. In FIG. 1B, 101, 102, and 105 are common to those of FIG. 1A.

Reference numerals 103a to 103d of FIG. 1B denote recording heads, and a positional relationship of them is shown. The recording heads 103a to 103d are arranged in such a manner that portions of recording ranges overlap with each other, and an image can be recorded in a width substantially equal to a transverse width of the recording sheet 101. The width of the pattern for measurement 102 is preferably equal to or larger than a recording width by the recording heads 103a to 103d. Reference number 104 denotes an image for measurement recorded by driving an optional number of recording devices of end portions of the recording heads 103a to 103d. The recording sheet 101 is relatively moved with respect to the recording heads 103a to 103d in a direction of an arrow 106 of the drawing to record the image.

The recording heads 103a to 103d are not linearly arranged, but a recording timing is controlled, and accordingly recorded dots can be formed substantially on the same straight line. The image for measurement 104 is recorded by repetition of printing/non-printing for each line, and an interval of the image in the conveying direction of the recording sheet 101 is twice a minimum dot interval in the same manner as in the pattern for measurement 102.

A line width of the pattern for measurement 102 is smaller than that of the image for measurement 104, and both can be easily distinguished. Alternatively, the pattern for measurement 102 may also be formed in a color different from that of the image for measurement 104 to facilitate the distinction. For example, when the color of the image for measurement 104 is cyan, the color of the pattern for measurement 102 is set to magenta, and accordingly the distinction between both is easily performed. For example, when the image for measurement 104 has four colors of black, cyan, magenta, and yellow, for example, two cyan and magenta patterns for measurement are used, and accordingly it is possible to measure the image for measurement of any color.

Figure 2:
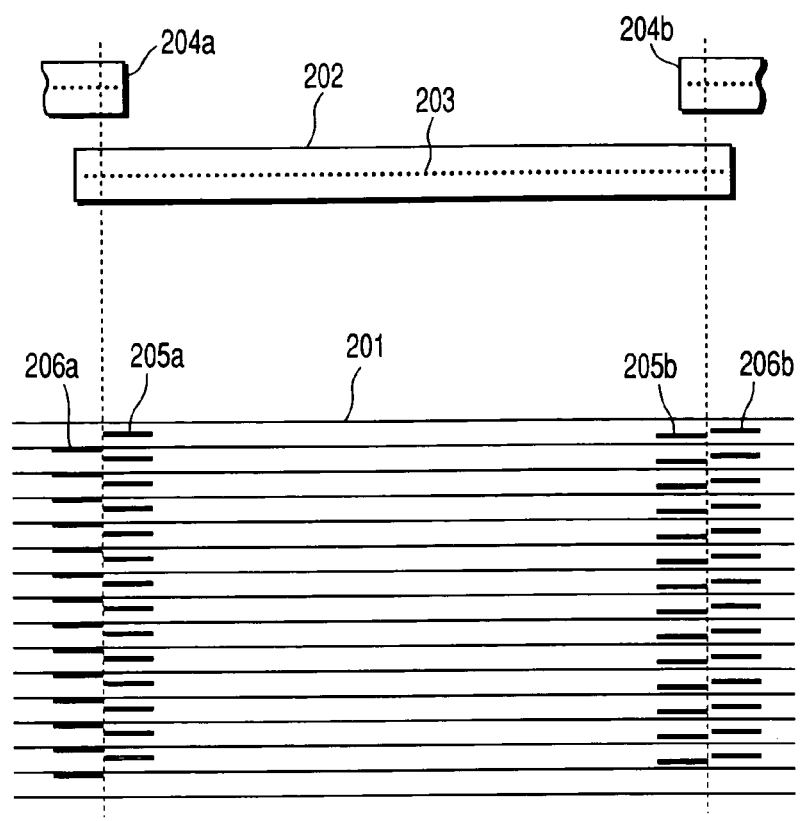
FIG. 2 is an enlarged view of a part of an image in a state in which an image for measurement 104 is formed on a pattern for measurement.

FIG. 2 is an enlarged view of a part of an image in a state in which the image for measurement 104 is formed on a pattern for measurement. In FIG. 2, 201 denotes the pattern for measurement, and corresponds to 102 of FIGS. 1A, 1B. 205a, 205b, 206a, 206b are images for measurement, and correspond to 104 of FIG. 1B. 202, 204a, 204b are recording heads, their positional relationship is shown in FIG. 2, and they correspond to 103a, 103b, 103c of FIG. 1B. 203 denotes a recording device formed on the recording head 202. In the image recording apparatus of an ink jet system, the recording device comprises nozzles which discharge ink.

In FIG. 2, since the images for measurement 205a, 205b formed in opposite end portions of the recording head 202 have different positions with respect to the pattern for measurement 201, it is seen that the recording head 202 is inclined on the basis of the pattern for measurement 201. Since the pattern for measurement 201 and images for measurement 205a, 205b both have repeated patterns, a shift amount from the pattern for measurement 201 is individually obtained with respect to each line of the images for measurement 205a, 205b or the like, an average value is obtained, and accordingly a positional shift of a recorded dot can be measured more correctly.

When the shift amount between the pattern for measurement and the image for measurement is similarly obtained also with respect to another recording head, and an attaching position or a recording timing of each head is adjusted to obtain a shift amount of 0, the position of the recorded dot recorded by each recording head moves onto a straight line, and an image can be formed without any distortion.

Figure 3A:
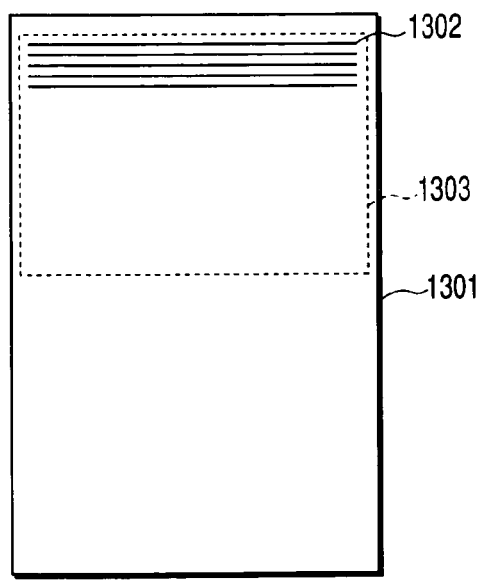
FIGS. 3A and 3B are explanatory views of a recording sheet capable of preventing ink from blurring.
Figure 3B:
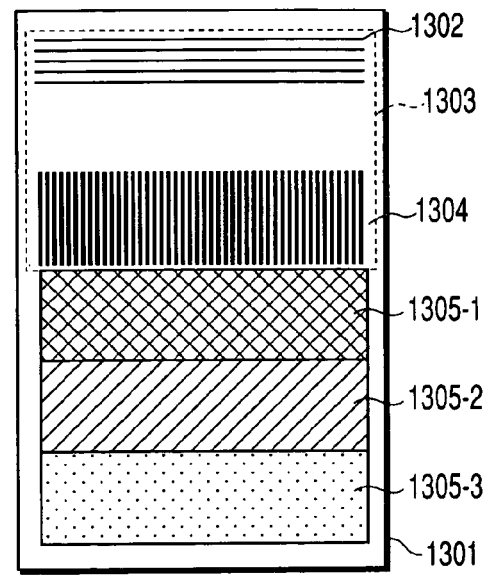

It is to be noted that a range in which the pattern for measurement exists on the recording sheet is subjected to processing so as to reduce the blur of the ink, and accordingly the position of the image for measurement can be measured more correctly. FIGS. 3A, 3B are explanatory views of the recording sheet subjected to this processing. In FIG. 3A, 1301 denotes a recording sheet, and 1302 denotes a pattern for measurement. A range 1303 including at least a part of the pattern for measurement 1302 is subjected to the blur preventive processing of the ink. For example, with the use of aqueous ink, the surface of the recording sheet is processed so as to be slightly lipophilic.

The recording sheet 1301 a part of whose surface has been subjected to the blur preventive processing of the ink is also effective for measuring density unevenness to correct the density unevenness of the image recording apparatus. In FIG. 3B, 1304 and 1305-1, 1305-2, 1305-3 denote images recorded by the recording head. The other numerals denote the same components as those of FIG. 3A. It is assumed here that 1305-1 has a high density, 1305-3 has a low density, and 1305-2 has an intermediate density.

Since the density unevenness generally appears differently depending on the density of the recorded image, as shown by 1305-1 to 1305-3, a uniform image signal is input in various densities, the recording head is driven to form the image, and the generated density unevenness is measured to calculate a density unevenness correction amount. At this time, it is important to correctly associate the position of the density unevenness with that of the recording element and to grasp a distribution shape of the density unevenness. Here, when a part of the image for the measurement of the density unevenness is recorded in a range shown by 1303, subjected to the blur preventive processing of the ink, a central position of each recorded dot forming the image can be easily specified in the range, and accordingly the distribution of the density unevenness can be correctly associated with the position of the recording element.

(Second Embodiment)

Figure 4:
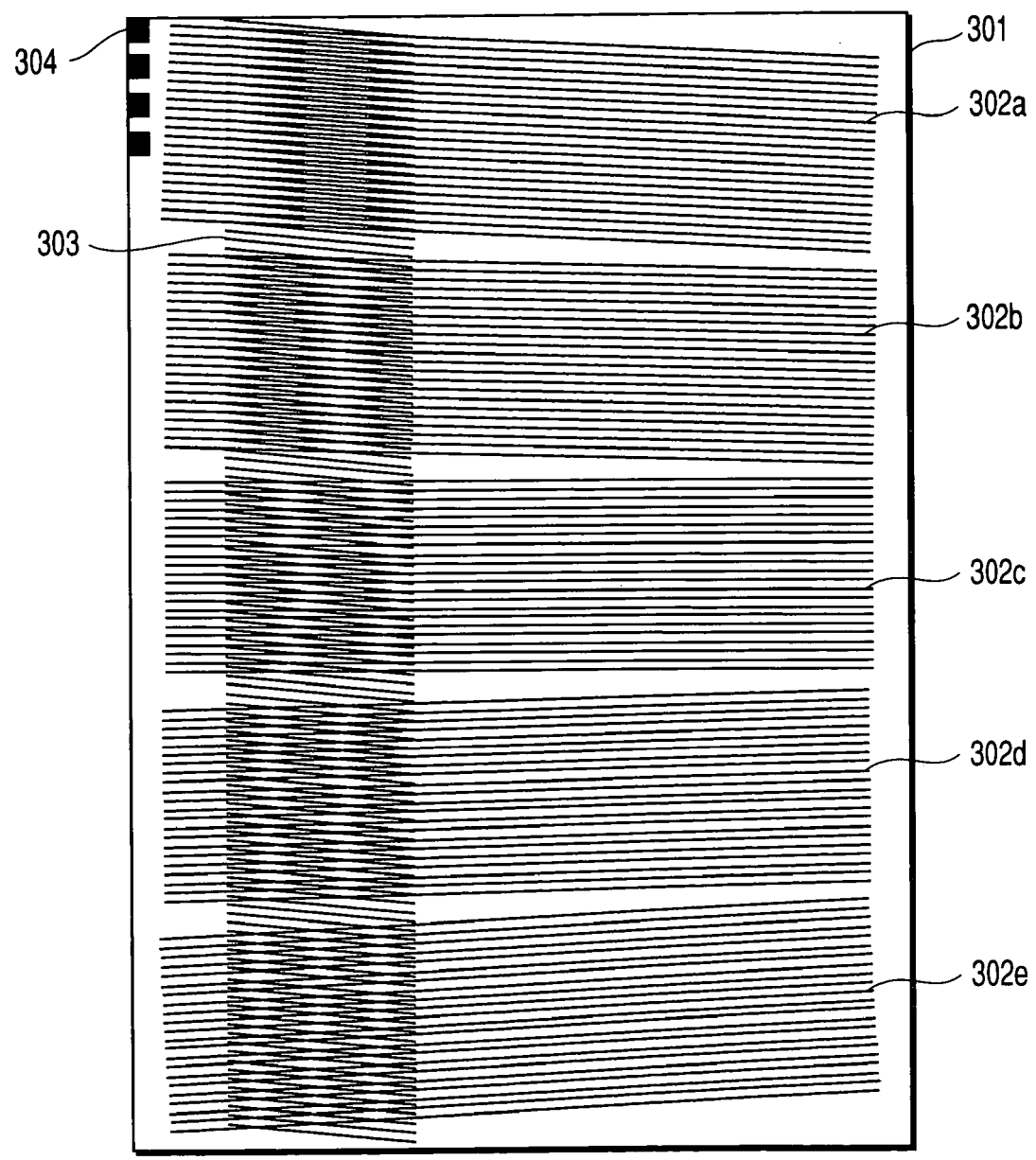
FIG. 4 is a diagram showing a second embodiment of the present invention.

FIG. 4 is a diagram showing a second embodiment of the present invention. In FIG. 4, 301 denotes a recording sheet main body, 302a to 302e denote patterns for measurement, and 303 denotes an image for measurement. The patterns for measurement 302a to 302e are formed beforehand on the recording sheet 301 of the present embodiment, and the image for measurement 303 is recorded by the recording head, when a correction amount of a recorded dot position is obtained. The patterns for measurement 302a to 302e have slightly different inclinations, and inclination angles are known. An interval of the patterns for measurement 302a to 302e and image for measurement 303 in the conveying direction of the recorded dot is twice the minimum dot interval in the same manner as in Embodiment 1 of the recording sheet. Reference numeral 304 denotes an identification mark for identifying a sheet type.

When the recording head is inclined and disposed with respect to the conveying direction of the recording sheet, the image for measurement 303 is also inclined and recorded. When the image for measurement 303 is recorded on the patterns for measurement 302a to 302e, Moire fringes are generated because of a difference of the angle of the pattern. In the Moire fringes, the number of fringes decreases in a case where a difference of the angle between both the patterns is small. Conversely, when the difference of the angle between both the patterns is large, the number of fringes increases. Therefore, the inclination angle of the recording head can be known from that of the pattern for measurement in which the number of Moire fringes is smallest.

In the example of FIG. 4, since the number of Moire fringes is minimum on the pattern for measurement 302a, it is seen that the inclination angle of the recording head is substantially equal to that of the pattern for measurement 302a. The pattern for measurement 302a whose inclination is more finely changed is prepared beforehand, and accordingly the inclination angle of the recording head can also be read more correctly.

(Third Embodiment)

Figure 5:
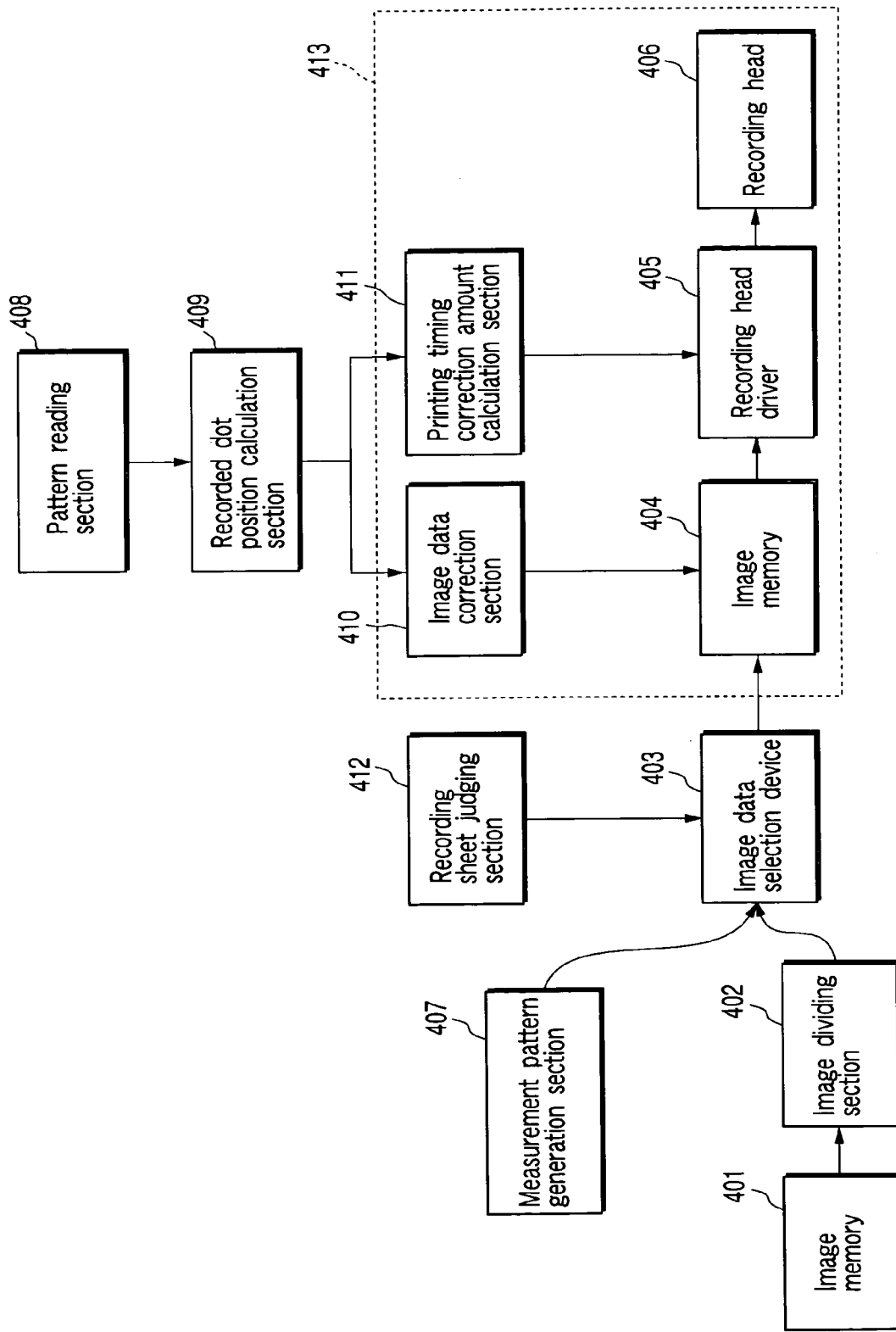
FIG. 5 is a diagram showing a third embodiment of the present invention.

FIG. 5 is a diagram showing a third embodiment of the present invention. In FIG. 5: 401 denotes an image memory which holds an input image; 402 denotes an image dividing section which divides the input image by a plurality of recording heads to record the images; 403 denotes an image data selection device which selects image data to be recorded from the input image and an image for measurement; 404 denotes an image memory which holds the divided image data; 405 denotes a recording head driver which drives/controls the recording head; 406 denotes a recording head; 407 denotes a ROM (generation section of the pattern for measurement) in which the data of the pattern for measurement is stored; 408 denotes an image scanner which is a pattern reading section; 409 denotes a recorded dot position calculation section; 410 denotes an image data correction section; 411 denotes a printing timing correction amount calculation section; and 412 denotes a recording sheet judging section which distinguishes the recording sheet. Elements in a broken-line frame 413 exist in each of a plurality of recording heads.

Next, an operation will be described. When the recording sheet having the pattern for measurement shown in FIG. 1 or 4 is set on the image recording apparatus of the present embodiment, the recording sheet judging section 412 reads the identification mark shown by 105 of FIG. 1 or 304 of FIG. 4 to recognize that the recording sheet having the pattern for measurement has been set. Moreover, the recording sheet judging section 412 instructs the image data selection device 403 to select an input from the measurement pattern generation section 407 and to write the image data of the pattern for measurement into the image memory 404.

In this case, the image data correction section 410 and the printing timing correction amount calculation section 411 are not allowed to operate, and the image data stored in the image memory 404 is not subjected to correction of the recorded dot position, and is recorded by the recording head 406 via the recording head driver 405. The recorded image (not shown) is read by the pattern reading section 408, and the position of the dot recorded by each recording head is analyzed in the recorded dot position calculation section 409. The recorded dot position is corrected by decomposition into rotational movement and parallel movement.

A rotational movement amount to correct the inclination of the recorded dot and a parallel movement amount to correct the positional shift of the recording head in a direction crossing the conveying direction of the recording sheet at right angles are transmitted to the image data correction section 410. On the other hand, the parallel movement amount to correct the positional shift of the recorded dot in the conveying direction of the recording sheet is transmitted to the printing timing correction amount calculation section 411, and accordingly the operation timing of the recording head driver 405 is controlled.

When a usual recording sheet is set on the present image recording apparatus, the recording sheet judging section 412 identifies the usual recording sheet, and instructs the image data selection device 403 to select a usual image. Accordingly, the image data selection device 403 selects input image data obtained by dividing the image data held in the image memory 401 and divided for each of the plurality of recording heads in the image dividing section 402, and writes the data into the image memory 404.

The image data stored in the image memory 404 is subjected to deformation processes such as the rotation and parallel movement in the image data correction section 410 by an amount corresponding to the parallel movement amount to correct the inclination angle of the recording head for use in recording the image data and the positional shift of the recording head in the direction crossing the conveying direction of the recording sheet at right angles, and the data is converted to minimize the distortion of the recorded image. The converted image data is read by the recording head driver 405, and recorded on the recording sheet by the recording head 406 at a timing at which the image is correctly reconstituted by a plurality of recording heads in accordance with the printing timing calculated in the printing timing correction amount calculation section 411.

In the pattern reading section 408, a linear image sensor scans the image to read the image. In this case, the image sensor scans and reads the image in the oblique direction with respect to the pattern for measurement or the stripe pattern of the image for measurement. The angle may be an angle at which a reading element of the image sensor obliquely crosses and reads several stripe patterns during the scanning of the linear image sensor of the pattern reading section 408. Because sampling points for reading the image with respect to the stripe pattern in the image sensor increase at this angle, and it is therefore possible to read an edge portion of the stripe pattern more correctly.

Figure 6:
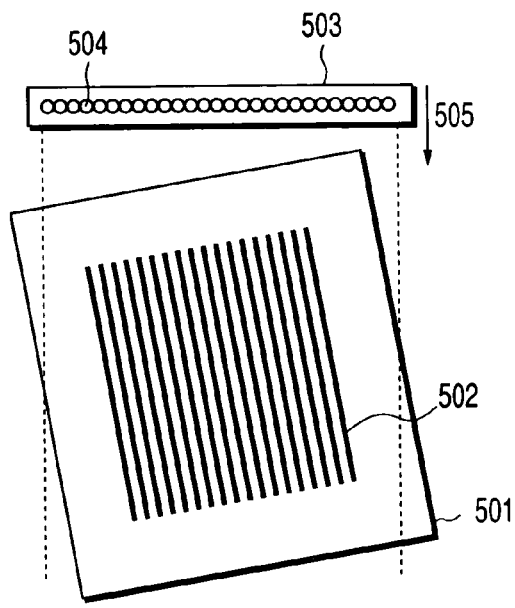
FIG. 6 is an explanatory view of a pattern reading operation.
Figure 7:
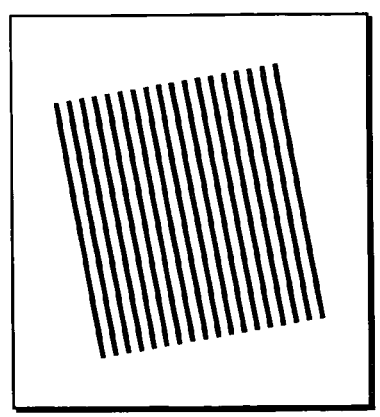
FIG. 7 is a diagram showing image data read by a scanning operation of a line sensor 503.

FIG. 6 is an explanatory view of the reading operation. In FIG. 6, 501 denotes a recording sheet, 502 denotes a pattern for measurement owned by the recording sheet 501 or an image for measurement formed on the recording sheet, 503 denotes a line sensor which is the pattern reading section (408 of FIG. 5), and 504 schematically shows a reading element (light receiving element) of the line sensor 503. When the line sensor 503 is scanned in a direction of an arrow 505 to read the image, the image data shown in FIG. 7 is obtained. Here, for the convenience of description, the operation will be described using a stripe pattern, but, in actuality, the stripe pattern in which the pattern for measurement has overlapped with the image for measurement is read, and the pattern is separated from the image using a difference of color or position so that the positional relationship between the pattern and the image is known.

Figure 8:
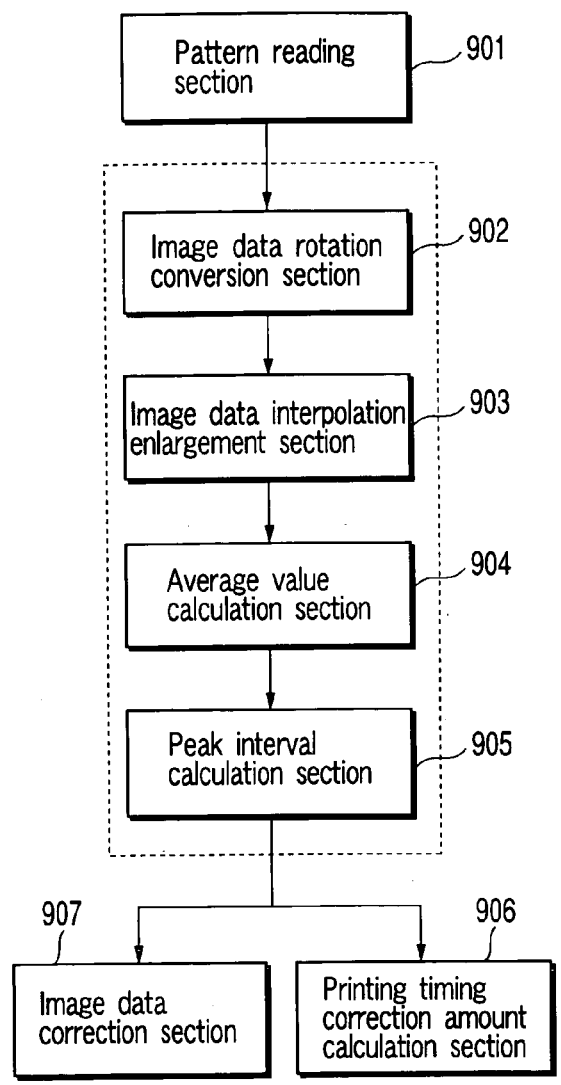
FIG. 8 is an explanatory view of details of a recorded dot position calculation section.

Here, details of the recorded dot position calculation section (409 of FIG. 5) will be described with reference to FIG. 8. Reference numeral 901 denotes the pattern reading section, and corresponds to 408 of FIG. 5. Reference numerals 902 to 905 correspond to the recorded dot position calculation section 409 of FIG. 5. Reference numeral 902 denotes an image data rotation conversion section, 903 denotes an image data interpolation enlargement section, 904 denotes an average value calculation section which obtains an average value of the image data for each string, and 905 denotes a peak interval calculation section. A printing timing correction amount calculation section 906 corresponds to 411 of FIG. 5, and an image data correction section 907 corresponds to 410 of FIG. 5.

Figure 9:
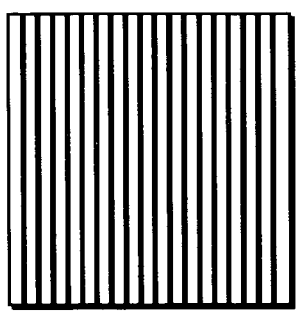
FIG. 9 is a diagram showing image data produced by rotation conversion of the image data read in a pattern reading section 901.
Figure 10:
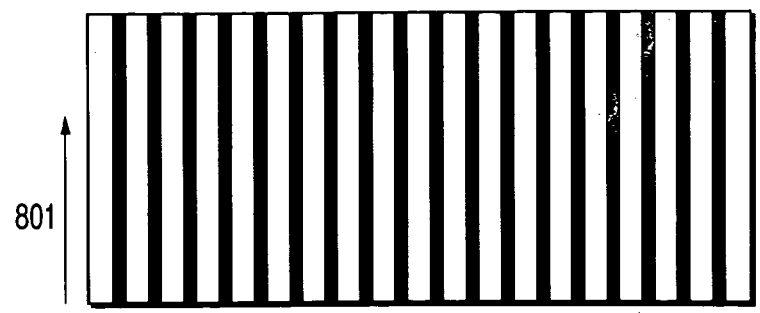
FIG. 10 is a diagram in which the image data shown in FIG. 9 is interpolated/enlarged in a transverse direction by an interpolation enlargement section 904.

In the image data rotation conversion section 902 to the average value calculation section 904 which obtains the average value for each string of the image data, a density distribution shape of the stripe pattern is obtained while obtaining the positional relationship between the pattern for measurement and the image for measurement. The image data is rotated/converted by the image data rotation section 902 in such a manner that the direction of the stripe of the stripe pattern of the image data shown in FIG. 7 read by the pattern reading section 901 becomes vertical, and the image data shown in FIG. 9 is produced. Additionally, a blank portion is removed in FIG. 9. Furthermore, the image data interpolation enlargement section 903 interpolates/enlarges the data in a transverse direction to obtain the image data as shown in FIG. 10. A method of interpolation/enlargement may be a simple method such as primary interpolation (straight line interpolation), or a more sophisticated method may also be used. A magnification of enlargement changes by a degree of precision with which the position of the recorded dot is to be corrected. However, for example, to perform the correction with a precision which is about 1/10 of a basic dot pitch, the magnification of enlargement may be set to about ten times. When the magnification of enlargement is set to ten times, a pitch of FIG. 10 is about 20 pixels.

Figure 11:
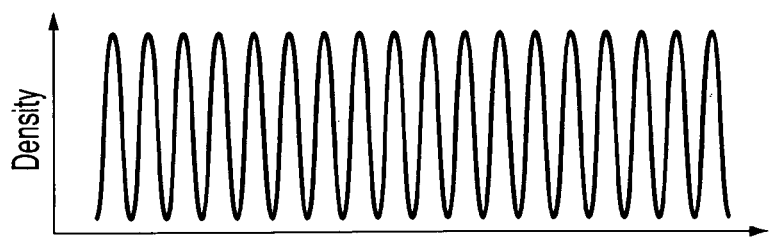
FIG. 11 is a diagram showing a one-dimensional data string obtained by calculating an average value in an average value calculation section 904.

Next, the average value calculation section 904 which obtains the average value for each string of image data calculates the average value of densities of pixels constituting the image data of FIG. 10 for each string in a vertical direction and, as a result, a one-dimensional data string is obtained as shown in FIG. 11. A peak interval is about 20 pixels. The peak interval calculation section 905 compares the position of the one-dimensional data string obtained as described above in the opposite ends of each of the plurality of recording heads to calculate the shift amount of the recorded dot position, further calculates a parallel movement component and a rotational movement component for correcting the positional shift, and outputs the components to the printing timing correction amount calculation section 906 and image data correction section 907.

A reason why detailed information of the density distribution of the stripes is obtained by the above-described process will be described in accordance with an example. The stripe pattern shown by 502 of FIG. 6 is recorded with a resolution of 300 dpi, and a reading resolution of the image scanner 503 is 1200 dpi, and when the pattern is simply read in parallel with a stripe direction, only eight data are obtained in a period of the stripes, and eventually the position of the peak of the density of the stripes is only read with a resolution of 1200 dpi which is the resolution of the scanner. Even with the interpolation/enlargement in a direction vertical to the stripes, there is not any change in the position of the peak of the densities of the stripes.

However, when the stripe pattern on the recording sheet is obliquely scanned with respect to the direction of the stripes as described here, an effect of the reading at a resolution exceeding that of the scanner is produced. Therefore, when the read image data is interpolated/enlarged in the direction vertical to the stripes, detailed information of the density distribution is obtained rather than in the interpolation/enlargement of the image scanned at 1200 dpi.

Since the peak position of the density of the stripes can be obtained correctly in this manner, the peak position of the pattern for measurement is compared with that of the image for measurement, and accordingly the shift amount of the recorded dot can be measured.

Figure 12:
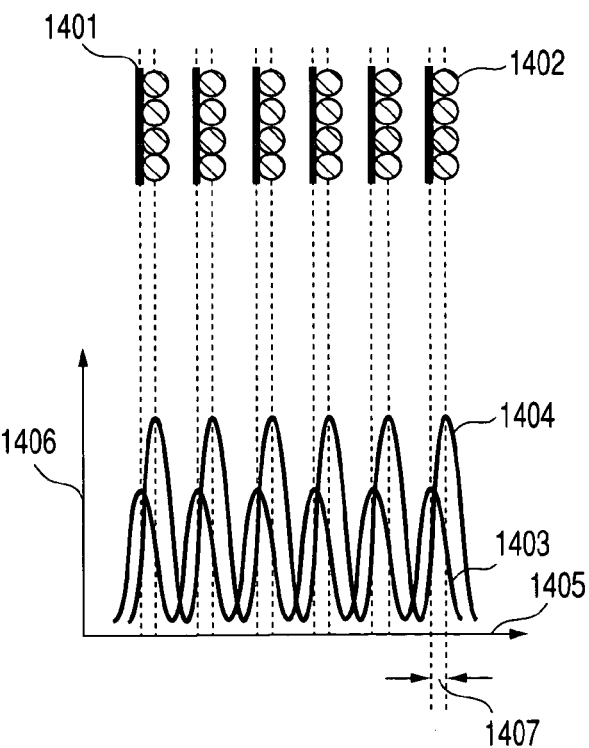
FIG. 12 is an explanatory view of measurement of a shift amount of a recorded dot.

FIG. 12 is an explanatory view of measurement of the shift amount of the recorded dot. In FIG. 12, 1401 denotes a part of the pattern for measurement, and 1402 denotes a part of the image for measurement. It is assumed that both positions shift by a ¼ pixel pitch. Each density distribution shape is obtained by the above-described process. Reference numeral 1403 denotes a density distribution shape of the pattern for measurement 1401, and 1404 denotes a density distribution shape of the image for measurement 1402. Abscissa 1405 of a graph indicates the position, and ordinate 1406 indicates the density. The shift amount between both the positions is known by a difference 1407 of the peak position between the density distribution shapes 1403 and 1404.

(Fourth Embodiment)

In the present embodiment, when a plurality of recording heads are joined to expand a recording width, and the image is recorded, in order to record the image without any distortion, the line direction of the recording element of each recording head is set to be correctly vertical to the conveying direction of the recording sheet. Moreover, the correction amount of the recorded dot position is obtained in order that the recorded dots of the adjacent recording heads are correctly laid on the same straight line.

The constitution of the image recording apparatus of the present embodiment is substantially similar to that of the third embodiment, and can be shown in FIG. 5. Additionally, the usual recording sheet which does not have any pattern for measurement is used as the recording sheet. That is, the recording sheet judging section (412 of FIG. 5) is not required. Since the pattern produced by the measurement pattern generation section (407 of FIG. 5), the pattern reading section (408 of FIG. 5), and the process content of the recorded dot position calculation section 409 differ, they will be described.

Figure 13:
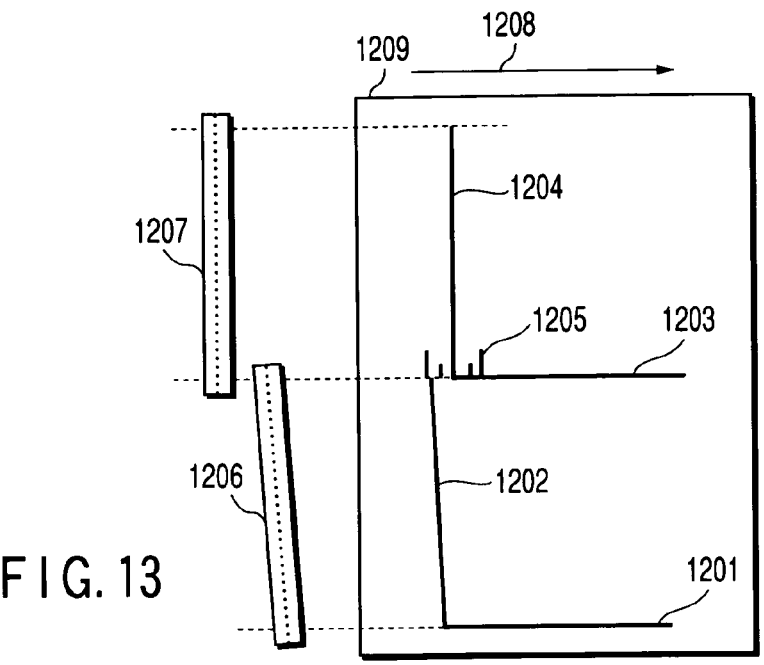
FIG. 13 is a diagram showing an image recorded on a recording sheet by image data produced by a measurement pattern generation section 407, and a positional relationship between recording heads 1206 and 1207.

First, a user operates the image data selection device 403, and drives the recording head 406 to record the image data produced by the measurement pattern generation section 407. Images shown by 1201 to 1205 of FIG. 13 are recorded on the recording sheet by the image data produced by the measurement pattern generation section 407. In FIG. 13, 1209 denotes a recording sheet, and 1206 and 1207 show a positional relationship between the recording heads.

The reference numerals 1201 and 1203 are images for distinguishing the conveying direction of the recording sheet, and correspond to the second image of the "sixteenth aspect" of the present invention described in the Brief Summary of the Invention. Here, they are referred to as conveying direction marks. The recording sheet 1209 is conveyed in a direction of 1208, and certain recording elements in the end portions of the recording heads 1206 and 1207 are repeatedly driven to record the marks. Lengths may be optional, but a certain length is required for correctly measuring the inclinations of the recording heads 1206 and 1207. The lengths equal to the recording widths of the recording heads 1206 and 1207 may be standards.

Reference numerals 1202 and 1204 are images for identifying the line direction of the recording element disposed in the recording head, and correspond to the first image of the "sixteenth aspect" of the present invention described in the Brief Summary of the Invention. Here, they are referred to as line direction marks. All the recording elements of the recording heads 1206 and 1207 are simultaneously driven to record the marks.

Furthermore, the marks capable of distinguishing the pitch of the recorded dots shown by 1205 are recorded in order to facilitate the measurement of the positional relationship between the adjacent recording heads. The recording head 1207 is driven to record the mark. Accordingly, the positional relationship between the line direction mark 1202 recorded by the recording head 1206 and the mark 1205 recorded by the recording head 1207 becomes obvious.

Next, the above-described image is read in the pattern reading section 408. In the third embodiment, the scanning direction of the image reading sensor is set to a direction different from the conveying direction of the recording sheet, but this is not especially required in this embodiment.

Next, the recorded dot position calculation section 409 reads the coordinate of the mark from the read image to calculate the shift amount of the recorded dot position.

Figure 14:
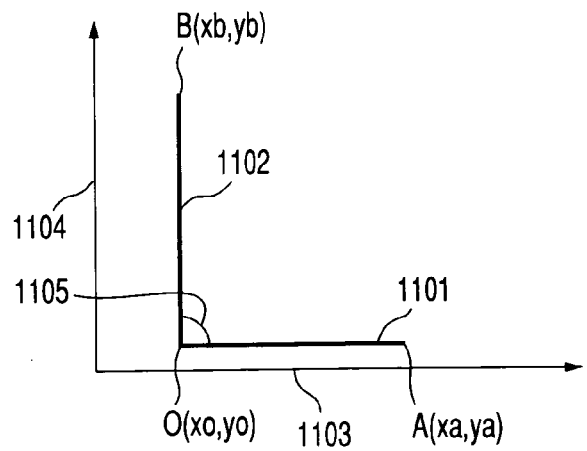
FIG. 14 is an explanatory view of a principle in which a recorded dot position calculation section 409 reads a coordinate of a mark from a read image to calculate the shift amount of the recorded dot position.

This principle will be described with reference to FIG. 14. In FIG. 14, 1101 denotes a conveying direction mark, and corresponds to 1201 and 1203 of FIG. 13. Reference numeral 1102 denotes a line direction mark, and correspond to 1202 and 1204 of FIG. 13. A coordinate of three points O, A, B shown in FIG. 14 is read from the conveying direction mark 1101 and line direction mark 1102. An address of the image data in X, Y-directions of the image data is used in the coordinate.

Assuming that the coordinates of three points O, A, B are (xo, yo), (xa, ya), (xb, yb) and an angle 1105 formed by the conveying direction mark 1101 and line direction mark 1102 is θ, θ can be obtained by the following equation (1):

$$\theta = \cos^{-1}\left(\frac{\overrightarrow{OA}\cdot\overrightarrow{OB}}{|\overrightarrow{OA}||\overrightarrow{OB}|}\right) \quad (1)$$
$$= \cos^{-1}\left(\frac{(xa-xo)(xb-xo)+(ya-yo)(yb-yo)}{\sqrt{(xa-xo)(xa-xo)+(ya-yo)(ya-yo)}\sqrt{(xb-xo)(xb-xo)+(yb-yo)(yb-yo)}}\right)$$

In this case, a unit is radian. On the basis of 90 degrees (0.5π radians), when θ shifts from 90 degrees, the shift amount is a recorded dot position correction amount. For example, θ is 91 degrees, the attaching angle of the recording head in which the line direction mark 1102 is recorded is rotated clockwise by one degree, and accordingly the position of the recorded dot matches a standard position.

Moreover, the positional shift amount of the recorded dot is read between the adjacent recording heads using the mark capable of distinguishing the pitch of the recorded dot shown by 1205 of FIG. 13. The correction amount of the recorded dot position of each recording head is calculated based on information on the positional shift of the recorded dot. For example, when the angle formed by the conveying direction mark 1201 and line direction mark 1202 is represented by the shift amount of the line direction mark 1202 in lower and upper ends in FIG. 13, the upper end shifts to the left by one dot as compared with the lower end, and the lower end of the line direction mark 1204 shifts to the right by 1.5 dots with respect to the upper end of the line direction mark 1202. When this is measured, the recording head 1206 is rotated/moved in such a manner that the upper end moves to the right by one dot, and the recording head 1207 may be moved in parallel in a left direction by 0.5 dots obtained by subtracting one dot of rotation correction of the recording head 1206.

Moreover, even when the angle formed by the conveying direction mark 1203 and line direction mark 1204 is not 90 degrees, the position of the upper end of the recording head 1207 may be similarly adjusted to correct the angle as 90 degrees.

In the present embodiment, the mark shown by 1205 is used to facilitate the measurement of the positional relationship between the adjacent recording heads. However, when the coordinates of end points of the line direction marks 1202 and 1204 are correctly known using the image scanner or the like, the mark shown by 1205 is not necessarily required.

Figures 15A, 15B:
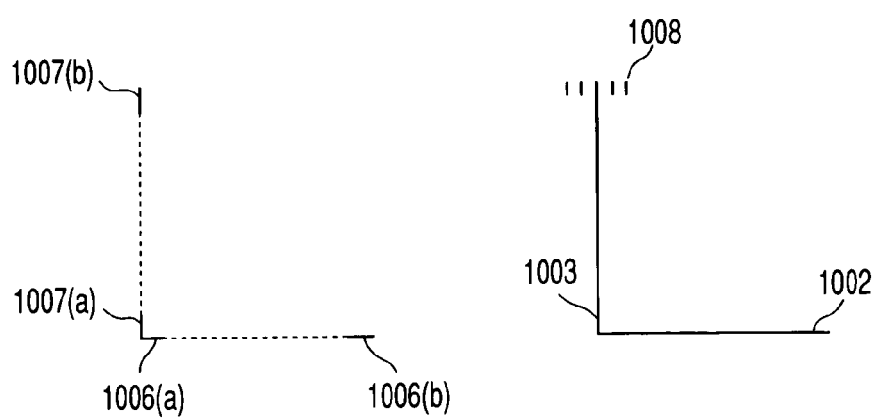
FIGS. 15A and 15B are explanatory views of another method in which an angle of a line direction with respect to a conveying direction is obtained.

A method of obtaining the angle of the line direction with respect to the conveying direction is not limited to the above-described method, and various methods are applicable. For example, as shown in FIG. 15A, only a part of the conveying direction mark may also be recorded as in 1006(*a*), 1006(*b*), and only a part of the line direction mark may also be recorded as in 1007(*a*), 1007(*b*). As shown in FIG. 15B, when a recorded dot 1008 capable of identifying the recorded dot interval is added to the line direction mark, the shift amount from the standard position of the recorded dot may also be directly obtained in an amount by a unit of the recorded dot interval.

As described above, since the correction amount of the position of the recorded dot is obtained, the position of the recorded dot may be similarly corrected in the same manner as in the third embodiment.

(Fifth Embodiment)

Figure 16:
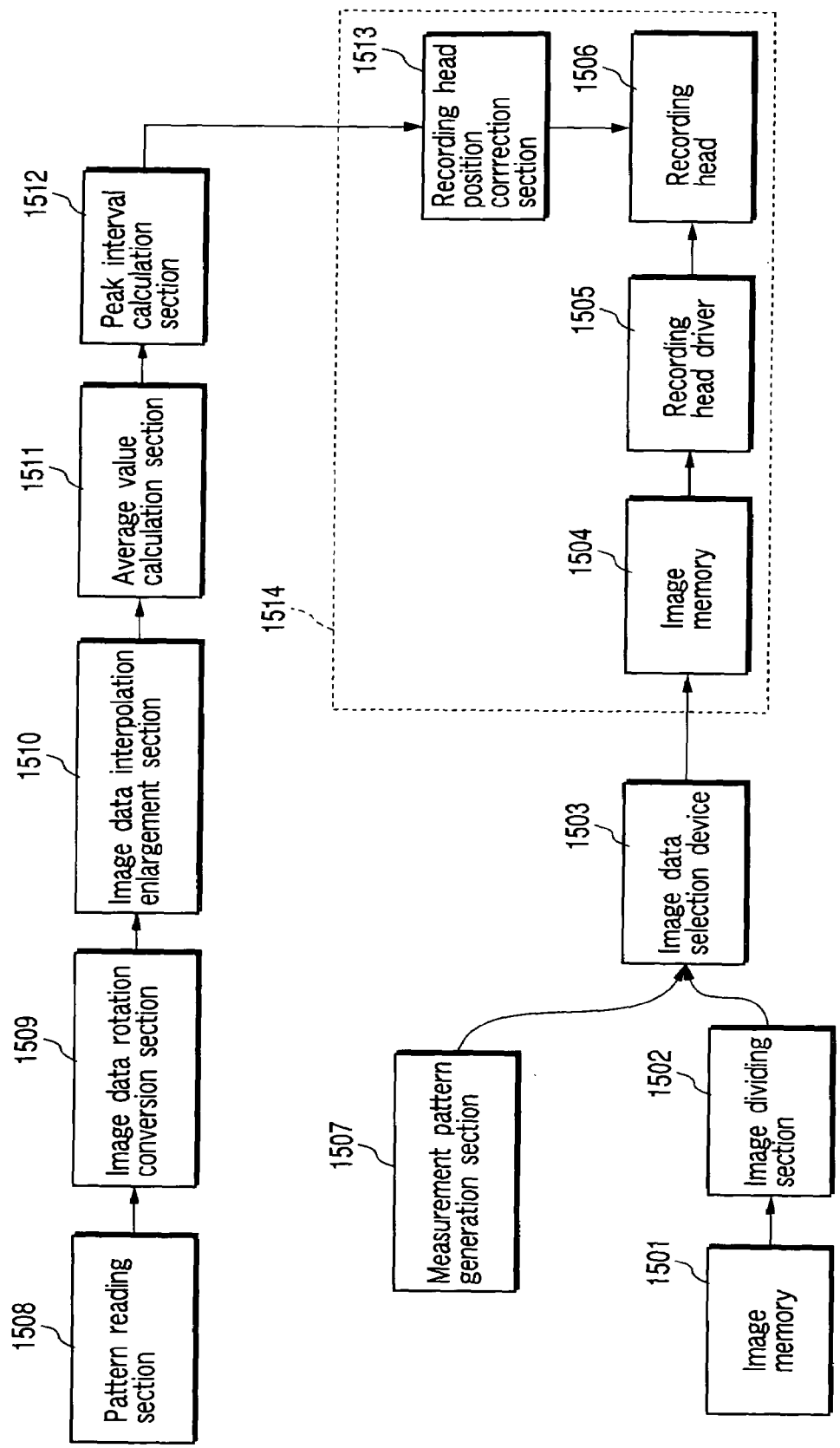
FIG. 16 is a diagram showing a constitution of an image recording apparatus of a fifth embodiment of the present invention.

FIG. 16 is a diagram showing a constitution of the image recording apparatus of the present embodiment. In FIG. 16: 1501 denotes an image memory which holds an input image; 1502 denotes an image dividing section which divides the input image by a plurality of recording heads to record the images; 1503 denotes an image data selection device which selects image data to be recorded from the input image and an image for measurement; 1504 denotes an image memory which holds the divided image data; 1505 denotes a recording head driver which drives/controls the recording head; 1506 denotes a recording head; 1507 denotes a ROM (generation section of the pattern for measurement) in which the data of the pattern for measurement is stored; 1508 denotes an image scanner which is a pattern reading section; 1509 denotes an image data rotation conversion section; 1510 denotes an image data interpolation enlargement section; 1511 denotes an average value calculation section which obtains an average value for each string of the image data; 1512 denotes a peak interval calculation section which calculates a peak interval of a density distribution shape; and 1513 denotes a recording head position correction section. Elements in a broken-line frame 1514 exist in each of a plurality of recording heads.

Next, an operation of the image recording apparatus of the present embodiment will be described. When usual image recording is performed, the user operates the image data selection device 1503 to select the data obtained by dividing the image data held by the image memory 1501 for each of the plurality of recording heads by the image dividing section 1502 to store the data in the image memory 1504. The image data stored in the image memory 1504 is read by the recording head driver 1505, reconstituted into an image on the recording sheet (not shown) by a plurality of recording heads 1506, and recorded.

To adjust the interval between the adjacent recording heads, the user operates the image data selection device 1503, and selects the image data produced by the measurement pattern generation section 1507 to store the data in the image memory 1504. The image data stored in the image memory 1504 is read by the recording head driver 1505, reconstituted into an image on the recording sheet (not shown) by a plurality of recording heads 1506, and recorded.

Figure 17:
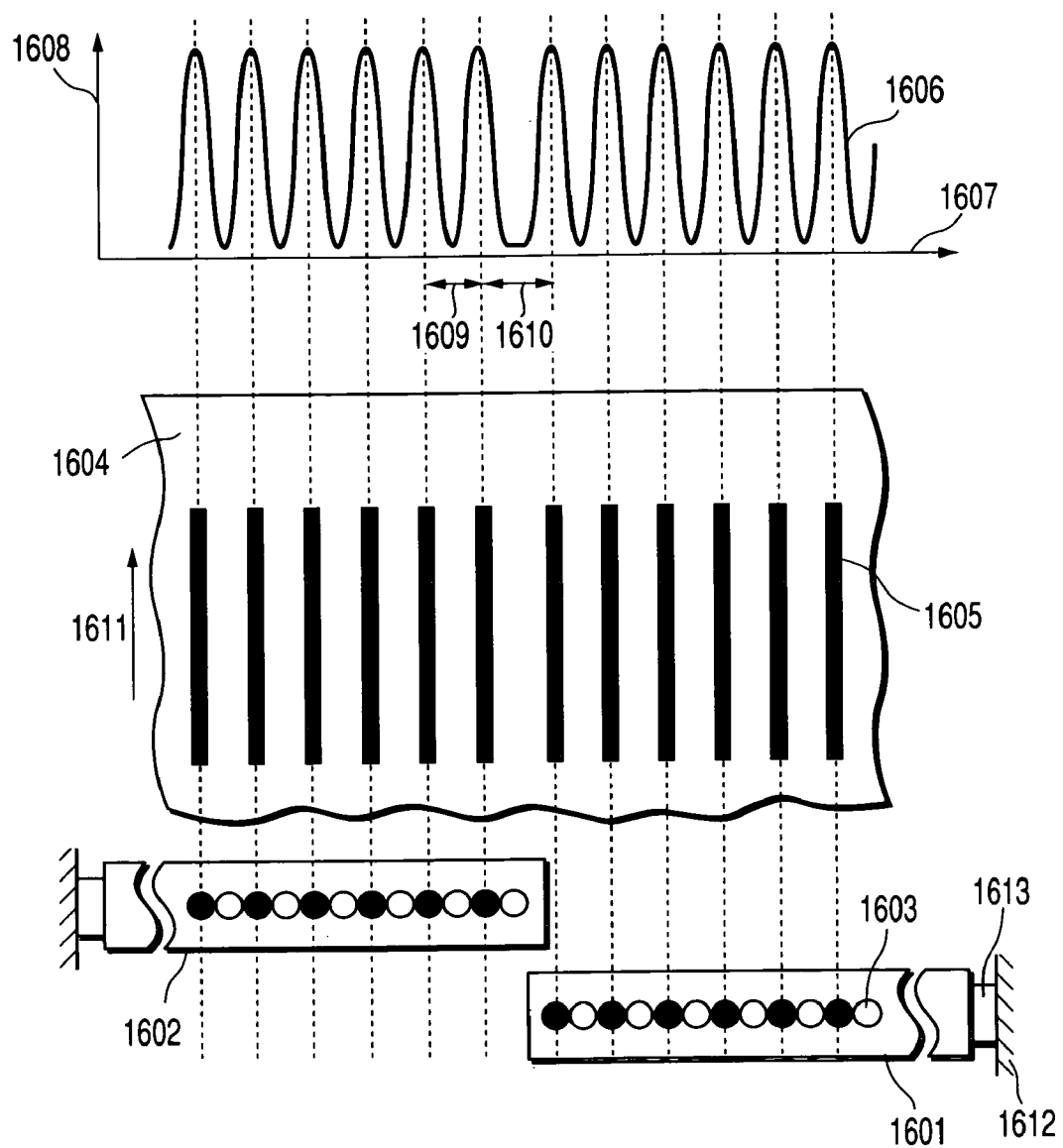
FIG. 17 is an explanatory view of an image for measurement produced by a measurement pattern generation section 1507.

The image for measurement produced by the measurement pattern generation section 1507 will be described with reference to FIG. 17. In FIG. 17, 1601 and 1602 show two adjacent recording heads, but a part is omitted from the drawing. Reference numeral 1603 denotes recording elements linearly arranged and formed on the recording head. The recording elements shown by black circles indicate recording elements which form the recorded dots in recording the image for measurement produced by the measurement pattern generation section 1507, and the recording elements shown by white circles indicate recording elements which do not form the recorded dots. Reference numeral 1604 shows a part of the recording sheet.

To perform the recording, a recording sheet 1604 is conveyed in a direction of an arrow 1611. Reference numeral 1605 denotes an image produced by the measurement pattern generation section 1507 and recorded on the recording sheet 1604. The image for measurement produced by the measurement pattern generation section 1507 is a stripe pattern parallel to the conveying direction of the recording sheet, obtained by driving the recording elements every other dot.

Here, a method of correcting an interval between the adjacent recording heads will be described with reference to FIG. 16. A constitution shown by 1508 to 1512 is similar to that shown by 901 to 905 of FIG. 8 described in the third embodiment. The image for measurement recorded on the recording sheet is read by the pattern reading section 1508, and converted into image data. At this time, the image is scanned and read in a direction different from the conveying direction of the recording sheet as shown in FIG. 6 to obtain the image data of the stripe pattern inclined as shown in FIG. 7.

The image data of the stripe pattern shown in FIG. 7 rotated/converted by the image data rotation conversion section 1509 in such a manner that the stripes extend in a vertical direction, and the image data is produced as shown in FIG. 9. Furthermore, the image data interpolation enlargement section 1510 interpolates/enlarges the data in a direction shown by an arrow 701 of FIG. 9 to obtain image data as shown in FIG. 10. A method or a magnification of interpolation/enlargement is set in the same manner as in the third embodiment.

Next, the average value calculation section 1511 which obtains the average value for each string of the image data calculates the average of density values of pixels constituting the image data of FIG. 10 for each string in a direction shown by an arrow 801 of FIG. 10, and a one-dimensional data string indicating the density distribution shape is obtained. A curve 1606 of FIG. 17 shows the density distribution shape for the image for measurement 1605 recorded on the recording sheet. In a graph of FIG. 17, the abscissa 1607 indicates the direction crossing the conveying direction of the recording sheet at right angles, and the ordinate 1608 indicates the density.

On receiving the data string of the density distribution shape produced by the average value calculation section 1511 which obtains the average value for each string of the image data of FIG. 16, the peak interval calculation section 1512 calculates a recording element interval (interval between two recording elements) shown by 1609 of FIG. 17 and a recording head interval shown by 1610. When two intervals shown by 1609 and 1610 indicate an equal value, the interval between two recording heads is appropriate for recording the image without any distortion.

When there is a difference in two intervals shown by 1609 and 1610 in FIG. 17, the recording head interval needs to be corrected in order to record the image without any distortion, and the difference between two intervals shown by 1609 and 1610 is a correction amount. The correction amount is transmitted to the recording head position correction section 1513 of FIG. 16, and the recording head position correction section 1513 corrects the position of the recording head 1506. Various methods are applicable to a method of moving the position of the recording head, but in this embodiment, a piezoelectric element shown by 1613 of FIG. 17 is used. The piezoelectric element is capable of changing a voltage to be applied to the element to control the thickness.

In FIG. 17, when the recording head 1601 is attached to a fixed member 1612 such as a housing of the image recording apparatus via the piezoelectric element 1613, the voltage to be applied to the piezoelectric element 1613 is controlled, so that the position of the recording head 1601 can be moved/controlled in a direction crossing the conveying direction of the recording sheet at right angles. When the interval between the adjacent recording heads 1601 and 1602 is adjusted in this manner, the position of the recorded dot can be corrected to record the image without any distortion. It is to be noted that even when the usual image recording is continuously performed, the above-described position correction of the recorded dot is sometimes performed in the intervals between the usual image recording, the recorded dot position can be constantly appropriately kept.

The average value is used for obtaining the density distribution shape in the above description, but another statistical value such as a total value may also be used.

(Sixth Embodiment)

In the present embodiment, a method of determining a dividing position of the image data will be described with reference to FIG. 18 in a case where the image data is divided into the line direction of the recording head, and input into a plurality of recording heads, and the image is reconstituted and recorded by the plurality of recording heads.

Figure 18:
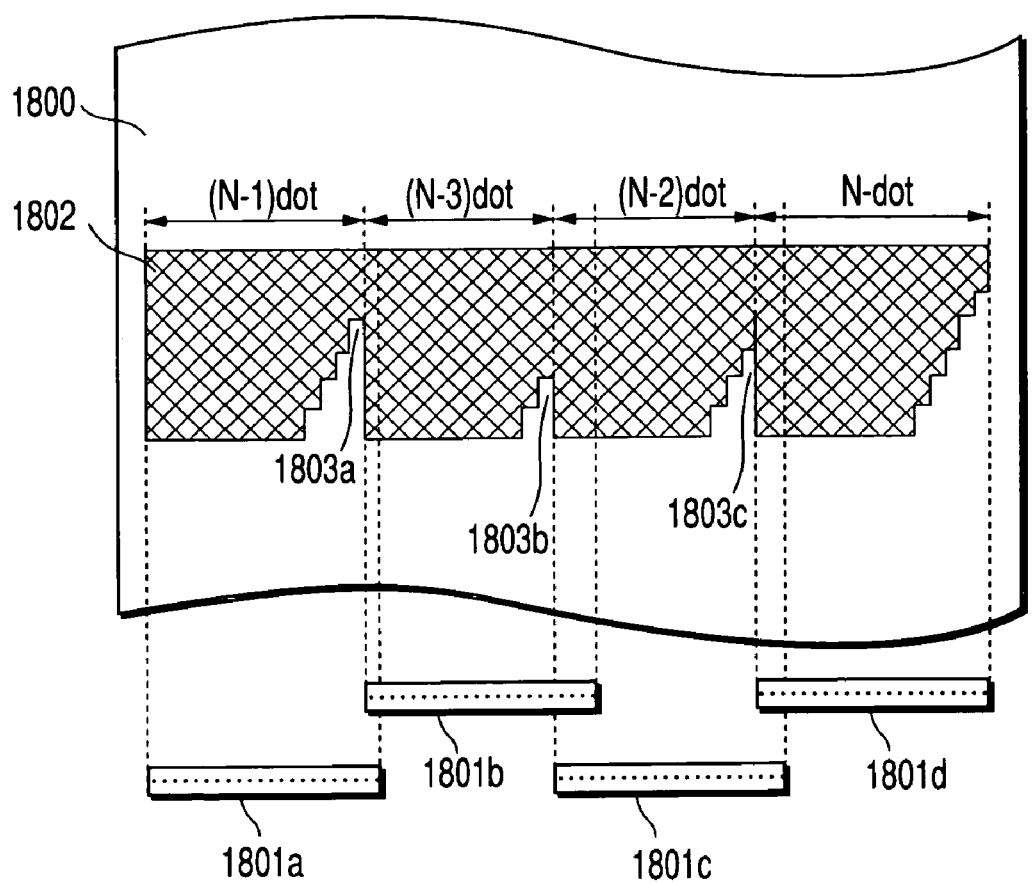
FIG. 18 is an explanatory view of a method in which a dividing position of the image data is determined in a sixth embodiment of the present invention.

In FIG. 18, 1800 denotes a recording sheet, and 1801a to 1801d denote recording heads. The recording heads 1801a to 1801d are arranged in such a manner that portions of recordable ranges overlap with each other.

Figure 19:
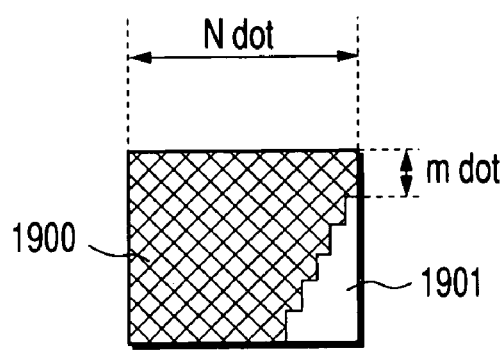
FIG. 19 is a diagram showing a shape of the image data to be input into recording heads 1801a to 1801d.

A recorded image 1802 indicates an image recorded by inputting the image data having a shape shown in FIG. 19 into the recording heads 1801a to 1801d. In the image data shown in FIG. 19, 1900 denotes printing data, and 1901 denotes non-printed data. A width of the printing data is constituted to decrease by each pixel for each constant number m of lines. That is, assuming that a total printing width of the recording head is N pixels, the first m line width corresponds to the N pixels, the next m line width corresponds to (N−1) pixels, further the next m line width corresponds to (N−2) pixels, and subsequently the width similarly decreases by one pixel every m lines. This is repeated until reaching a width obtained by subtracting a supposed maximum head overlap width from a head width.

The line constituting the recorded image 1802 is first a connected line (in an upper part of the drawing). When the recorded line advances, a cut is generated in the line as shown by 1803a to 1803c. A recording width to be handled by the corresponding head is determined by a line number, in which the cut is made, counted from the first line. For example, assuming that a gap 1803a is generated in a y-th line counted from the first line, a value obtained by subtracting a quotient obtained by dividing (y−1) by m from N, that is, n of the following equation (2) indicates the recording width to be handled by the corresponding head 1801a. Additionally, several dots are required for image processing such that a joint between the adjacent heads is actually set to be inconspicuous, and therefore the recording width handled by the head 1801a is slightly larger than n.

$$n = N - (y-1)/m \text{ (where/denotes calculation of the quotient)} \quad (2)$$

According to the present invention, since a position of a recording head can be measured, a position of a recorded dot can be corrected to record an image without any distortion.

Moreover, since a pattern for measurement can be easily distinguished from an image for measurement recorded by the recording head, the position of each recording head can be easily measured.

Furthermore, since the pattern for measurement having a color different from that of ink recorded by the recording head is usable, the position of each recording head can be measured regardless of the color of the ink recorded by the recording head, and the position of the recorded dot can be corrected to record the image without any distortion.

Additionally, since the pattern for measurement can be easily distinguished from the image for measurement measured by the recording head, the position of each recording head can be easily measured.

Moreover, since the position of each recording head is measured a plurality of times, and an average value of results can be obtained, the position of each recording head can be obtained more correctly.

Furthermore, when Moire is generated by the pattern for measurement and the image for measurement recorded by the recording head, the position of each recording head can be measured with a high precision.

Additionally, wince the position of the dot can be measured more correctly by blur preventive processing of ink, the position of each recording head can be measured more correctly.

Moreover, since the type of the recording sheet or the pattern for measurement can be identified by an identification mark indicating the type of the pattern for measurement, switching between usual image recording and recording for measurement of a recorded dot position correction amount, or selecting of the image for measurement can be automatically performed.

Furthermore, since an attaching position of the recording head can be measured every time a rolled sheet is changed, the position of the recorded dot can be constantly corrected to record the image without any distortion.

Additionally, when the image produced in a measurement image data generation section is recorded on the supplied pattern for measurement, an adjustment amount of the recorded dot position is known. Therefore, when the position of a recorded image is accordingly corrected in a recorded image position correction section formed by the recording head, there can be provided an image recording apparatus capable of recording a high-quality image without any distortion.

Moreover, since the type of the supplied recording sheet can be identified in a mark identification section, there can be provided an image recording apparatus capable of automatically performing the switching between the usual image recording and the image recording for measurement of the recorded dot position correction amount, or the selecting of the image for measurement.

Furthermore, since the attaching position of the recording head can be measured every time the rolled paper is changed, there can be provided an image recording apparatus capable of constantly correcting the position of the recorded dot to record the image without any distortion.

Additionally, when the image produced/recorded in the measurement image data generation section is read in a direction different from the conveying direction of the recording sheet in an image reading section, the position of the image can be measured with a high resolution exceeding a basic resolution of the reading section, and therefore there can be provided an image recording apparatus capable of correcting the position of the recorded image with the high precision to record the image without any distortion.

Moreover, since an image rotation section, interval section, and average value calculation section are capable of measuring the position of the image with the high precision, there can be provided an image recording apparatus capable of correcting the position of the recorded image with the high precision to record the image without any distortion.

Furthermore, when Moire is generated by the pattern for measurement formed on the recording sheet and the image for measurement recorded by the recording head, and measured in a Moire fringe measurement section, there can be provided an image recording apparatus capable of correcting the position of each recording head with the high precision to record the image without any distortion.

Additionally, the position of the recorded dot formed by the recording head is corrected in accordance with an angle formed by a line direction and a conveying direction obtained from a first image recorded in a recording section to record an image capable of distinguishing the line direction of the recording head and a second image recorded in a recording section to record an image capable of distinguishing the conveying direction of the recording sheet. Accordingly, there can be provided an image recording apparatus capable of correcting the position of the recording head to record the image without any distortion.

Moreover, the position of the recorded dot formed by the recording head is corrected in accordance with the angle formed by the line direction and the conveying direction obtained from an image obtained by reading the first image recorded in the recording section to record the image capable of distinguishing the line direction of the recording head and the second image recorded in the recording section to record the image capable of distinguishing the conveying direction of the recording sheet by the image reading section. Accordingly, there can be provided an image recording apparatus capable of correcting the position of the recording head to record the image without any distortion.

Furthermore, there can be provided an image recording apparatus capable of easily determining a recording width to be handled by each of the plurality of recording heads by a positional relationship between a position fixed pattern included in the image produced by the measurement pattern generation section and a position moving pattern, which is recorded by two adjacent recording heads.

Additionally, there can be provided an image recording apparatus capable of easily determining the recording width to be handled by each of the plurality of recording heads by a positional relationship between opposite ends of a segment constituting the image produced by the measurement pattern generation section, which is recorded by two adjacent recording heads.

What is claimed is:

1. An image recording apparatus comprising:
   a recording head section which achieves an expanded recording width by recording a plurality of interconnected images;
   a mark identification section which identifies whether or not an identification mark is present on a recording sheet in the image recording apparatus, and which identifies, based on identification of the identification mark: (i) whether or not a pattern for measurement is provided on the recording sheet, and (ii) a type of the pattern for measurement if it is determined that the pattern for measurement is provided on the recording sheet;
   a measurement image generation section which produces image data for measurement;
   an image data selection section which selects the image data for measurement to be recorded on the recording sheet in accordance with an identification result of the mark identification section, such that the image data for measurement is recorded on the pattern for measurement on the recording sheet, when the pattern for measurement is provided on the recording sheet;
   a peak interval calculation section which calculates a shift amount based on a positional relationship between the image data for measurement recorded on the recording sheet and the pattern for measurement provided on the recording sheet; and
   a printing timing correction amount calculation section which corrects a position of a recorded image formed by the recording head section based on the shift amount calculated by the peak interval calculation section.

2. An image recording apparatus comprising:
   a recording head section which achieves an expanded recording width by recording a plurality of interconnected images;
   a mark identification section which identifies whether or not an identification mark is present on a recording sheet in the image recording apparatus, and which identifies, based on identification of the identification mark: (i) whether or not a pattern for measurement is provided on the recording sheet, and (ii) a type of the pattern for measurement if it is determined that the pattern for measurement is provided on the recording sheet;
   a measurement image generation section which produces image data for measurement;
   an image data selection section which selects the image data for measurement to be recorded on the recording sheet in accordance with an identification result of the mark identification section, such that the image data for measurement is recorded on the pattern for measurement on the recording sheet, when the pattern for measurement is provided on the recording sheet;
   an image reading section including a line sensor which performs a scanning operation in a direction intersecting obliquely with at least one of: (i) a line constituting at least a part of the image for measurement, and (ii) a line constituting at least a part of the pattern for measurement;
   an image rotation conversion section which rotates image data read by the image reading section;
   an image data interpolation enlargement section which performs interpolation on each row of the image data rotated by the image rotation conversion section to increase a number of data items;
   an average value calculation section which calculates an average value of each column of data output from the image data interpolation enlargement section; and
   a peak interval calculation section which calculates a shift amount from a difference between a peak position of a one-dimensional data string which is output by the average value calculation section based on image data obtained by reading the pattern for measurement, and a peak position of another one-dimensional data string which is output by the average value calculation section based on image data obtained by reading the image data for measurement.

3. An image recording apparatus comprising:
   a recording head section which comprises a plurality of recording heads and which achieves an expanded recording width by recording a plurality of interconnected images with the plurality of recording heads, respectively; and
   a measurement image generation section which produces an image for measurement which comprises a plurality of lines extending along a line direction of the plurality of recording heads, wherein all of the lines have a same fixed first end position, and wherein respective different ones of the lines have respective different second end positions.

4. The image recording apparatus of claim 3, wherein the second end position of the lines changes every line.

5. The image recording apparatus of claim 3, wherein the second end position of the lines changes every several lines.

* * * * *